United States Patent

Huboi et al.

[15] 3,644,664

[45] Feb. 22, 1972

[54] CORRECTION LEVEL ADJUSTMENT FOR VIDEO NEGATIVE ANALYZER

[72] Inventors: Robert W. Huboi, Webster; Edward M. Waz, Hilton; Thomas G. Seckel, Rochester, all of N.Y.

[73] Assignee: Eastman Kodak Company, Rochester, N.Y.

[22] Filed: Mar. 16, 1970

[21] Appl. No.: 19,719

Related U.S. Application Data

[63] Continuation-in-part of Ser. No. 741,008, June 28, 1968, abandoned.

[52] U.S. Cl. ..........................................................178/5.2 A

[51] Int. Cl. ..........................................................H04n 9/04

[58] Field of Search..........................178/5.2 A, 5.2 D, 5.4 C; 355/32, 35, 38

[56] References Cited

UNITED STATES PATENTS 3,136,845 6/1964 Farber ....................................178/5.2
3,355,984 12/1967 Puschmann..............................178/5.2
3,417,196 12/1968 Dreyfoos, Jr. et al...................178/5.2
3,030,437 4/1962 James et al. ............................178/5.4

*Primary Examiner*—Richard Murray
*Assistant Examiner*—P. M. Pecori
*Attorney*—Robert W. Hampton and R. Lewis Gable

[57] ABSTRACT

Photographic color negatives are scanned to produce red, green and blue color signals representative of the respective red, green and blue transmission densities of the negative to control the electronic reproduction of the negative as a visual image. The visual image is created by the sequential reconstruction of the red, green and blue components of the negative scene over a predetermined time period. A logic circuit receives the red, green and blue color signals during sequential time periods and stores the red, green and blue color signals over the total time period. A color correction circuit including at least three matrixes of impedance elements receives each of the color signals to provide a sequential color correction signal for each color signal dependent upon the response of the other color signals over the total time period. The impedance elements of the matrixes may be adjusted to provide color correction signals dependent upon the various characteristics of the printer on which the negative is to be printed.

4 Claims, 3 Drawing Figures

ROBERT W. HUBOI
THOMAS G. SECKEL
EDWARD M. WAZ
*INVENTORS*

BY R. Lewis Gable
Robert W Hampton

ATTORNEYS

ROBERT W. HUBOI
THOMAS G. SECKEL
EDWARD M. WAZ
*INVENTORS*

BY R. Lewis Gable

Robert W. Hampton
ATTORNEYS

ROBERT W. HUBOI
THOMAS G. SECKEL
EDWARD M. WAZ
INVENTORS

BY R. Lewis Gable
Robert W. Hampton
ATTORNEYS

CORRECTION LEVEL ADJUSTMENT FOR VIDEO NEGATIVE ANALYZER

CROSS-REFERENCE TO RELATED APPLICATION

This application is a continuation-in-part of application Ser. No. 741,008, filed June 28, 1968, and now abandoned.

BACKGROUND OF THE INVENTION

1. Field of the Invention

This invention relates to apparatus for analyzing color image signals and more particularly to such apparatus for providing a color correction for each color image signal as a function of the other color image signals.

2. Description of the Prior Art

Devices are well known which view an object such as a color negative or transparency, process the information derived therefrom and display the object in corrected colors. Such devices may or may not invert the image derived from the object, i.e., change from a negative to a positive image. Such a device, commonly known as a color analyzer, senses the object, either as a negative or a positive image, and introduces a color correction so that each color has a predetermined density and displays the object with the corrected color.

Often such color analyzers are used in conjunction with apparatus for printing a negative or positive transparency onto a color sensitive print stock. Typically, various color printers have color characteristics which vary from printer to printer dependent upon the type of projection system used and/or the source of radiation or light used to illuminate the object. As a result, difficulties sometimes arise since the level and proportion of color correction indicated by the color analyzer do not take into account the color characteristics of a particular printer. Therefore, the resulting color print from a particular printer will not appear the same as the image displayed upon the color analyzer.

Further, color analyzers have typically utilized a single radiation sensitive element such as a photomultiplier or television tube to sequentially sense the primary colors, e.g., red, green and blue, of a particular image. The use of just one sensing device is desirable in many applications since the use of a radiation sensitive device for each color would introduce the additional uncertainty of varying response from the different sensitive devices and their associated circuit apparatus. However, when only a single radiation sensitive device is used, the prior art devices have been only capable of analyzing a single color at a time and of providing a color correction for a particular image based upon the analysis of but one color signal at a time. In such apparatus, it has been found that the color correction may tend to over emphasize a single color with the result that the color balance of the resultant color image may be dominant in one color and deficient in the remaining colors. This problem is particularly noticeable when the color image to be analyzed has a predominance of a single color.

SUMMARY OF THE INVENTION

It is therefore the object of this invention to analyze a color image as a function of all the colors in the image and to avoid correction based upon but a single color.

It is a further object of this invention to provide a color analyzer with the capability of matching its correction to that of any printer so that the scene shown by the color analyzer will be substantially identical to the product output of the printer.

These and other objects of the invention are attained by color correction apparatus including circuit means responsive to the sequentially generated input color signals that are representative of the densities of the component colors of a color image to continuously produce corresponding output color signals during the sequential generation of the input color signals. The output color signals are each combined through the impedances of a plurality of matrixes to produce a plurality of color correction signals. The color correction signals are sequentially applied to means for producing the input color signals to vary the magnitudes thereof in accordance with the characteristics of a printer on which the negative is to be printed or the display device.

BRIEF DESCRIPTION OF THE DRAWINGS

For a better understanding of the invention, reference is made to the drawings.

DESCRIPTION OF THE PREFERRED EMBODIMENTS

Figure 2:
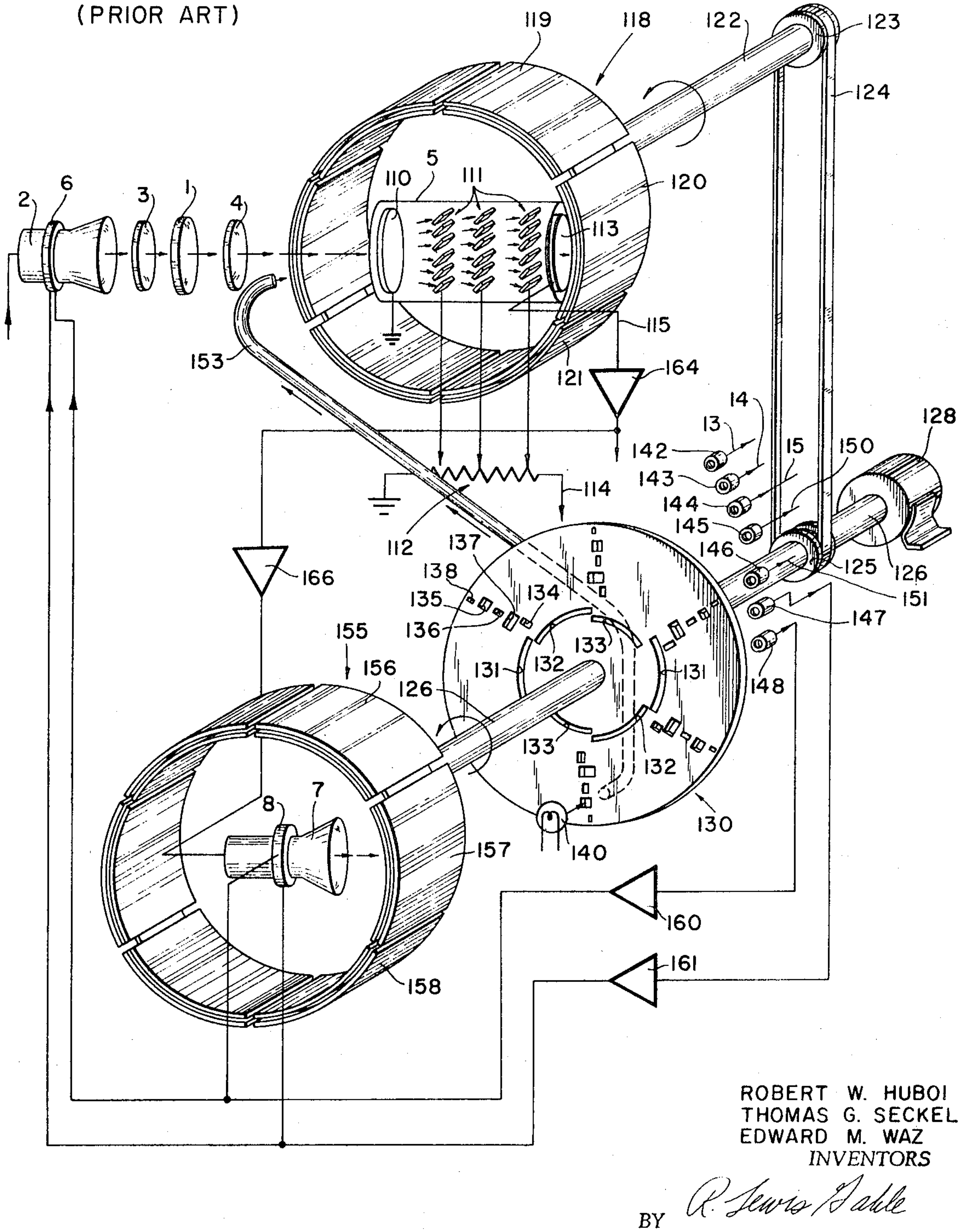
FIG. 2 (PRIOR ART)
FIG. 2 is a diagrammatic showing a prior art color analyzer.

Referring now to drawings and in particular FIG. 2, there is shown a television system which is used in a prior art color analyzer. An image bearing medium 1, such as a positive or negative piece of film, is scanned by a flying spot scanner 2, which is shown as a cathode-ray tube. More specifically, a narrow beam of light is generated and scanned across the medium 1 by the firing spot scanner 2. The narrow beam of light is focused by a lens 3 onto the medium 1, and the modulated beam of light is directed by a lens 4 onto a photosensitive element 110 of a suitable radiation sensitive device such as a photomultiplier 5. As shown in FIG. 2, the photomultiplier 5 may include a plurality of dynodes 111 for successively multiplying the electrons generated by the photosensitive element 110 in response to incident radiation, and a plate element 113 for receiving the multiplied electrons and for providing an output signal indicative of the incident radiation. As will be explained later, a potential is connected to a resistive element(s) 112 and successively more positive potentials are derived therefrom and applied to the dynodes 111 to thereby accelerate and multiply the electrons onto the plate element 113. The potential applied across the resistive network 112 to ground may be varied to thereby control the gain of the output signal derived from the plate element 113 and applied to a line or conductive path 115.

As the flying spot scanner 2 scans the narrow beam of light in successive fields across the medium 1, a drum 118 is rotated about the radiation-sensitive device 5 to bring filters 119, 120 and 121 successively in position to intercept the modulated beam being projected onto the radiation-sensitive device 5. More specifically, the filter 119 transmits red light (or radiation), whereas the filters 120 and 121 respectively permit the transmission of green and blue radiation onto the radiation-sensitive device 5. As shown in FIG. 2, a second set of red, green and blue filters may be provided on the drum 118. Further, the drum 118 is fixedly connected to a driven shaft 122, to which a rotational movement is applied through a pulley 123, a drive belt 124 and a pulley 125 which is fixedly connected to a drive shaft 126. In turn, the drive shaft 126 is connected to a synchronous motor 128 which not only serves to rotate the drum 118, but also serves to rotate a timing disc 130 and a second rotating drum 155 in a controlled relation with the drum 118. As will become evident upon further explanation, the red filter 119 will be disposed in front of the radiation-sensitive device 5 during a first scanning of the beam of radiation in a first field and then successive scanning of the beam of radiation in second and third fields will be performed when respectively the green and blue filters are disposed between the medium 1 and the radiation-sensitive device 5.

Figure 1:
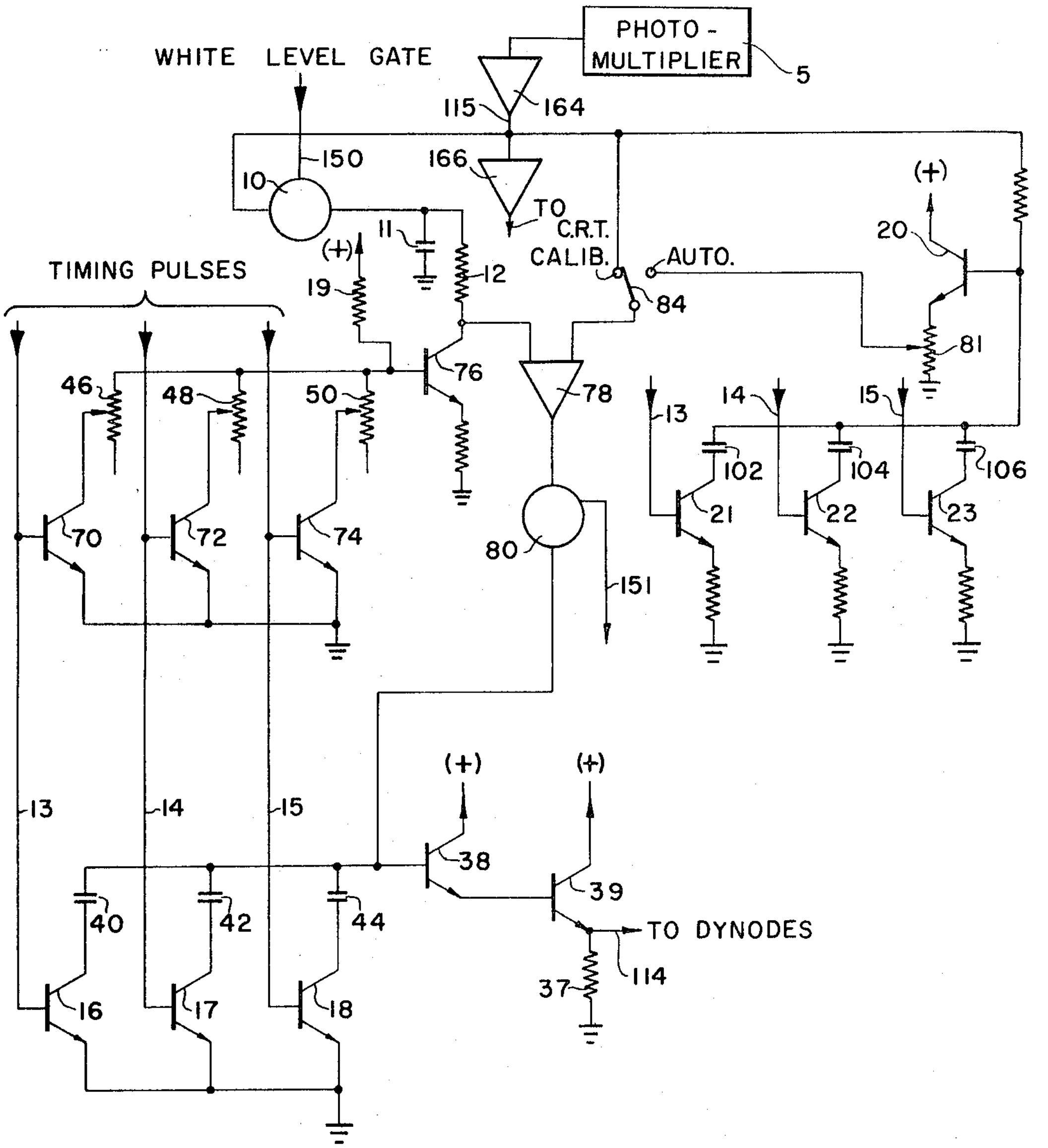
FIG. 1 (PRIOR ART)
FIG. 1 is a simplified schematic diagram of the color control circuits of a prior art color analyzer.

As shown in FIGS. 1 and 2, the output signal developed upon the plate element 113 of the radiation sensitive devices is applied through video amplifiers 164 and 166 to a suitable display device such as a cathode-ray tube 7. As will be explained later, the horizontal and vertical deflection fields developed by a yoke assembly 8 disposed about the cathode-ray tube 7 is synchronized with the scan of the electron beam by the horizontal and vertical reflection yokes 6 disposed about the flying spot scanner 2. As a result, an image corresponding to that of the medium 1 is displayed upon the face of the cathode-ray tube 7. An observer will view the images displayed upon the cathode-ray tube 7 in color due to the rotation of a drum 155 which presents in sequence a red filter 156, a green filter 157 and a blue filter 158 in front of the cathode-ray tube 7 as successive fields of information are scanned thereon.

Synchronization of the vertical and horizontal scans of the flying spot scanner 2 and the cathode-ray tube 7 as well as the various operations of the color analyzer circuit to be described are controlled and synchronized by the timing disc 130. More specifically, a plurality of openings or slits are provided through the disc 130 and a plurality of radiation sensitive devices such as photocells 142 to 148 are aligned with corresponding apertures to sense radiation directed therethrough as the disc 130 is rotated. More specifically, a set of slits 131, 132 and 133 are disposed at increasing radii from the drive shaft 126 and are respectively aligned with photocells 142, 143 and 144. As shown in FIG. 2, a second set of slits similarly spaced will also be sequentially rotated past the photocells 142, 143 and 144. The light source or sources (not shown) is so disposed to direct radiation through the slits 131, 132 and 133 and onto the photocells 142, 143 and 144 respectively as each slit is aligned with its respective photocell. The photocells 142, 143 and 144 respectively generate timing or synchronizing signals corresponding to the length of time of the fields scanned by the flying spot scanner 2 and for each of the red, green and blue signals. Thus, the red synchronizing signal is generated by the photocell 142 and applied to a line or conductive path 13 whereas the green and blue synchronizing signals are applied to the lines 14 and 15.

Further, a set of openings 135 are disposed with respect to the slits 131, 132 and 133 as shown in FIG. 2 so as to be periodically aligned between a light pipe 153 and a reference lamp 140. As shown in FIG. 2, the light directed through the opening 135 will be transmitted by the pipe 153 to be sensed by the radiation-sensitive device 5. The intensity of the light transmitted to the radiation-sensitive device 5 is controlled by the spacing of the reference lamp 140 with respect to the light pipe 153, i.e., the greater the distance of the lamp 140, the less intense the transmitted radiation. Openings 136 are each disposed in FIG. 2 with respect to the openings 134 and are further aligned with the photocell 146. As a result, when radiation is transmitted through one of the openings 136 onto the photocell 146, a timing signal will be applied to a line 151 to energize a Gate 80 (see FIG. 1) to thereby facilitate the measurement of the radiation transmitted through the light pipe 153 by the radiation sensitive device 5.

Another set of openings 134 are disposed with respect to the slits 131, 132 and 133 and the opening 135 to periodically transmit radiation onto the photocell 145, which in response thereto generates onto a line 150 a timing signal which is applied to gate 10 (see FIG. 1) to thereby apply the white level signal provided by the radiation-sensitive device 5 circuit elements of FIG. 1. The white level signal is that signal generated by the radiation-sensitive device 5 when zero or no radiation is directed onto the radiation-sensitive device 5. The white level signal will be applied or gated to the circuit to be described by the signal derived from the photocell 145 at a time controlled by the placement of the opening 134 during the last vertical scan of the flying spot scanner 2 when the focused beam of radiation is directed onto a darkened peripheral or border portion of the medium 1. The white level signal provides electrical reference information for standardization, calibration and stabilization of the color analyzer circuits to be described.

Further, a pair of openings 137 and 138 are disposed with respect to a source or sources of radiation (not shown) to periodically direct radiation therefrom onto the photocells 147 and 148 respectively, which in turn provide timing signals to control the vertical and horizontal deflection of the flying spot scanner 2 and the cathode-ray tube 7. More specifically, the timing signals generated by the photocells 147 and 148 are applied respectively to the horizontal and vertical deflection amplifiers 160 and 161, which in turn respectively control the synchronized horizontal and vertical deflection provided by the deflection yokes 6 and 8.

Normally, it would be desirable to display a positive image on the cathode-ray tube 7 from a medium 1 taking the form of a negative; if so an inverting circuit would be disposed in the output circuit of the radiation-sensitive device 5. In addition, it is desirable to display the medium 1 on the cathode-ray tube 7 with the color correction made in the video signal applied to the cathode-ray tube 7. The color correction circuitry to be described below will be provided with color intensity controls regulating the intensity of each color in the display. These controls may be calibrated so that an operator may easily transfer this information to a printing apparatus to achieve the desired color correction of the print derived from the medium 1.

Referring now to FIG. 1, the video signal derived from the radiation-sensitive device 5 is applied to the white level gate 10, which responds to the white level gate signals derived from photocell 145 during the intervals defined by the timing disc of FIG. 2 to pass the video signal to the circuits elements 11 and 12. The video signal derived from the device 5 at the point in time of the application of the white level gating signal is indicative of the zero or no light signal from the radiation sensitive device and is used as a reference signal of both color and intensity for calibration purposes. A capacitor 11 coupled to the gate 10 stores the white level video signal to provide a reference potential, which is applied through a resistor 12 to the collector of a transistor 76 and also to one of the inputs of a differential amplifier 78. The synchronizing pulses corresponding to the red, green and blue fields of video information are applied along lines 13, 14 and 15 respectively to the bases of transistors 70 and 16, transistors 72 and 17 transistor 74 and 18. The operation of the color correction system will be explained in detail with respect to that portion of the circuitry operating upon the red video signal. It should be understood that the operation is identical for those portions of the circuit operating on the green and blue circuitry.

The red synchronizing signal applied to lead 13 turns "on," or renders conductive, transistors 70 and 16. As a result, current is drawn through a resistor 19, a variable resistance 46 and the transistor 70 to ground. The magnitude of the current is set by the adjustment of the variable resistance 46 which in one illustrative embodiment may take the form of a logarithmic potentiometer. Therefore, the voltage on the base of the transistor 76, and thus the collector voltage of the transistor 76, is determined by the setting of the variable resistance 46. Further, there is provided a switch 84 which sets the operation of the color analyzer circuit from a calibrate to auto mode of operation. When the switch 84 is disposed in the calibrate position, the output signal derived from the radiation-sensitive device 5 is applied to one input of the differential amplifier 78. As a result, the differential amplifier 78 will provide a calibration signal which is the difference between the white level signal as stored upon the capacitor 11, as modified by the setting of the logarithmic potentiometer 46, and the video signal derived from the radiation sensitive device 5. The calibration signal of the differential amplifier 78 is applied through a gate 80 which is turned on and off by a timing signal generated by the photocell 146 as explained above. The calibration signal derived from the gate 80 is applied to an amplifier, consisting of a pair of transistors 38 and 39, which in turn regulates the voltage applied to the dynodes 111 of the photosensitive device 5 in order to regulate the gain of the photosensitive device 5. Gate 80 is turned "on" by the timing signal derived from the photocell 146 during that segment of time in which the light or radiation derived from the reference lamp 140 is applied to the radiation-sensitive device 5. Thus, during this period, a video signal is applied to the differential amplifier 78, which signal may be varied by changing the position of the reference lamp 140 and which serves as a reference amplitude signal against which the gain of the dynodes 11 is determined.

As stated above, the transistors 16, 17 and 18 are turned "on" at the same time as the transistor 70, 72 and 74 are turned on by the synchronizing signals applied to the lines 13, 14 and 15, respectively. Thus, while the red timing pulse is generated by the photocell 142, both transistors 70 and 16 are turned "on." The calibration signal derived from the differential amplifier 78 through the gate 80 is a function of the setting of the logarithmic potentiometer 46, the white level signal stored upon the capacitor 11, and the reference signal corresponding to the reference lamp 140 as viewed through a red filter. The calibration signal derived from the gate 80 is applied to a capacitor 40 when the transistor 16 is turned "on." The capacitor 40 will charge to the level of the output signal derived from the differential amplifier 78, during the period when gate 80 is turned "on." Corresponding processes will occur to charge capacitors 42 and 44 when the green and blue timing signals are applied respectively to transistors 17 and 18.

When switch 84 is disposed in its automatic position, the signal applied to the second input of the differential amplifier 78 is derived through a transistor 20. As shown in FIG. 1, transistors 21, 22 and 23 are gated on by the color timing signals applied on lines 13, 14 and 15. As a result, during that time in which the red field is being sensed by the radiation-sensitive device 5, the red timing signal is applied to the base of the transistor 21 and the red video signal is applied to a capacitor 102. Therefore, the entire red video signal corresponding to a single frame of video information is integrated upon capacitor 102 so that the potential developed upon capacitor 102 is an indication of the average density of the red video signal. As shown in FIG. 1, the potential developed on the capacitor 102 is applied to the base of the transistor 20. The potential applied in the automatic mode to the second input of the differential amplifier 78 is a function of the average density of the red color as derived from capacitor 102. In a manner similar to this, average density signals for the green and blue video signals may be successively applied to the differential amplifier 78 to thereby determine the gain of the photosensitive device 5.

It is evident from the above discussion that the prior art color analyzer is deficient in that its automatic mode of operation does not take into account the effect that one color may have on another color in determining the degree of color correction that is to be imparted to the image. For example, when such a color analyzer is used in conjunction with another piece of equipment such as a printer or a graphic arts scanner, the dyes or inks are not pure colors but are interrelated to present a color image.

Figure 3:
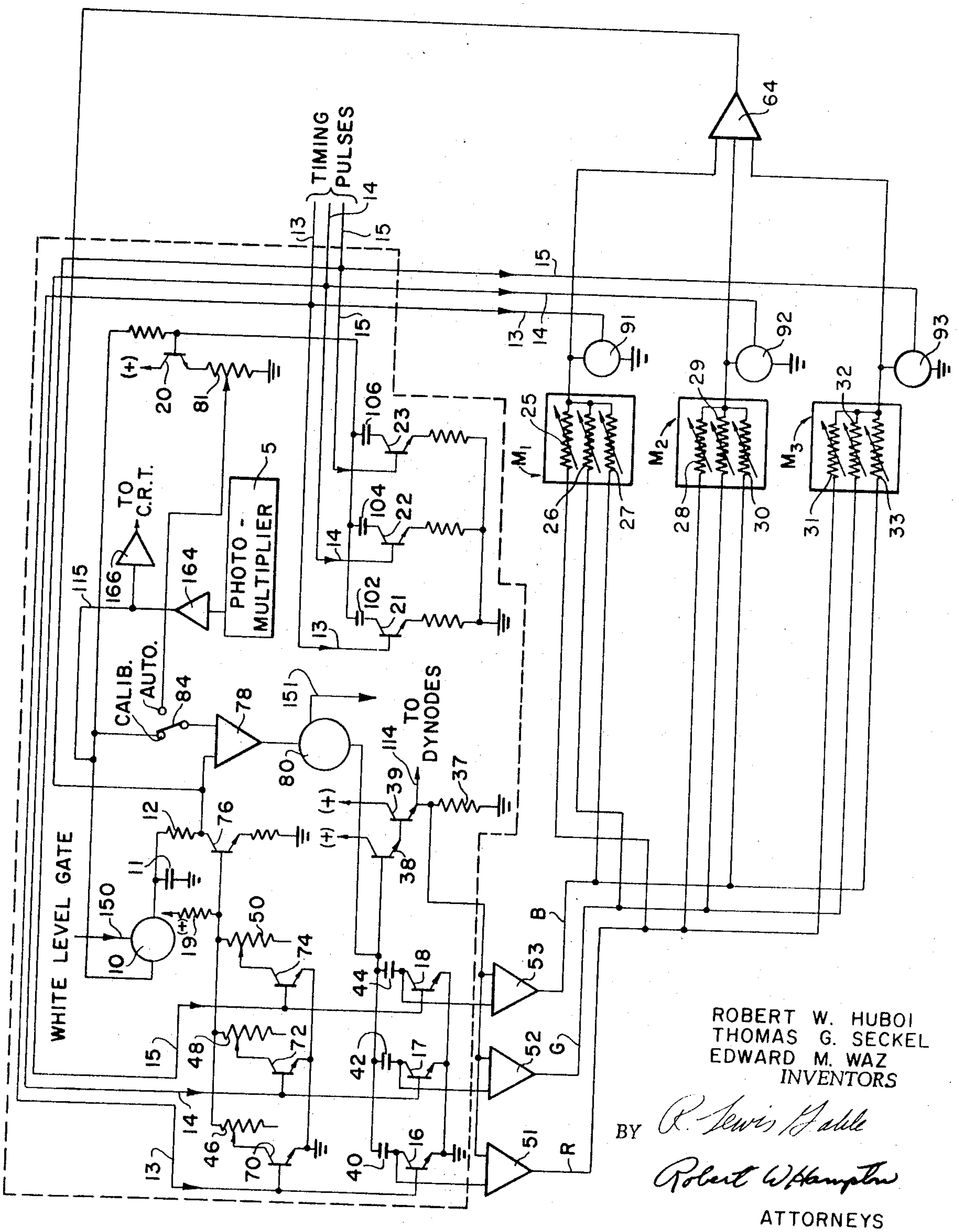
FIG. 3 is a simplified schematic of a color analyzer including the logic circuitry and color correction matrixes in accordance with teachings of this invention.

With reference to FIG. 3, there is shown an illustrative embodiment of this invention which permits a color analyzer to be adapted to various types of automatic printing systems. It is noted that the elements of the circuitry of FIG. 3 identified with similar numbers as shown in FIG. 1 refer to the same elements and operate in a manner similar to that described above. During operation of the circuit shown in FIG. 3, each of the capacitors 40, 42 and 44 store a voltage signal representative of the color density of the frame of video information sensed by the radiation-sensitive device 5. In order to provide a color correction signal which is a function of the other colors present in the image, it is necessary to provide a continuous or constant source of the voltage signal which is representative of the particular color density. As shown in FIG. 3, this is achieved by connecting an output terminal of the dynode amplifier comprising of transistors 38 and 39 to one input terminal of differential amplifiers 51, 52 and 53. The second input signals to the differential amplifiers 51, 52 and 53 are derived from the capacitors 40, 42 and 44 respectively. The output signals of the differential amplifiers 51, 52 and 53 represent the DC voltage levels which are the differences between the input signals and, as will be explained below, are proportional to the red, green and blue density of the images projected onto the radiation sensitive device 5. During the red time, a red timing signal is developed as explained above and applied on line 13 to turn the transistors 16 "on" and to thereby connect the capacitor 40 to ground, while the output of the transistor 39 provides a red density signal R. During the green time, the point of interconnection between transistor 16 and capacitor 40 provides a signal representative of the green density signal G minus the red density signal R, because the capacitor 42 is the only capacitor in this group being charged. However, the green density signal applied to the base of the transistor 38 is successively amplified by the transistors 38 and 39 and then is applied to one terminal of the differential amplifier 51. As a result, the output signal derived from the differential amplifier 51 is a voltage signal which represents the red density. In a similar manner, during the blue time, the voltage signal developed at the point of interconnection of capacitor 40 and transistor 16 represents the blue density signal B minus the red density signal R, and the output signal derived from the differential amplifier 51 is the red density signal R. Thus, the resultant output signal derived from the differential amplifier 51 is a voltage signal which represents the red density signal at all times. These operations are shown below in the following table:

| | Emitter of Transistor 39 | Collector of Transistor 16 | Operation of Differential Amplifier 51 | Output of Differential Amplifier 51 |
|---|---|---|---|---|
| Red Time | R | 0 | R–0 | R |
| Green Time | G | G–R | G–(G–R) | R |
| Blue Time | B | B–R | B–(B–R) | R |

The above analysis is the same for the operation of this circuit upon the green and blue density signals, and the output signals derived from the differential amplifiers 51, 52 and 53 are voltages representing the red, green and blue densities respectively on a continuous basis.

Once the red, green and blue density signals are provided continuously during the successive color scans, they can be mixed in any proportion to obtain a correction factor for a single color as a function of the densities of the remaining colors. As shown in FIG. 3, each of the red, green and blue density signals are applied to the matrixes M1, M2 and M3 respectively to insure that the red, green and blue colors are correctly displayed. The matrix M1 for providing the desired interrelated correction of the red density signal is made up of variable resistances 25, 26 and 27 to which the output signals derived from the differential amplifier 51, 52 and 53 are respectively applied. In a similar manner, the matrix M2 related to the correction factor imparted to the green portion of the image includes variable resistances 28, 29 and 30, whereas the matrix M3 related to the correction of the blue portion of the image includes variable resistances 31, 32 and 33. The three density signals are mixed in respective matrixes to produce three correction equation. The correction equations are:

$$Rc=A_{11}R+A_{12}G+A_{13}B$$
$$Gc=A_{21}R+A_{22}G+A_{23}B$$
$$Bc=A_{31}R+A_{32}G+A_{33}B$$

The variable resistances 25–33 may be calibrated to be read out to provide the coefficients $A_{11}$ to $A_{33}$ of the above equations. In one particular embodiment, the variable resistances 25 to 33 may be set to provide correction coefficients relating to the characteristics of a photographic printing apparatus in which the image-bearing medium 1 is to be printed. As explained above, each particular printing apparatus has its own set of color characteristics depending on color filters used and/or the source of radiation used.

The resultant correction signals derived from the matrixes M1, M2 and M3 are selectively applied to a summing amplifier 64 by a plurality of gates 91, 92 and 93, which are triggered by the timing signals derived from the lines 13, 14 and 15 respectively. For example, the red correction signal is applied to the summing amplifier 64 when the red timing signal is applied to the gate 91 thereby disconnect the output terminal of the matrix M1 from ground and connect it to an input terminal of the summing amplifier 64. The gates 92 and 93 perform similar functions for the green and blue correction signals. The three correction signals are fed to the input terminals of summing amplifier 64, whose output signal is the sum of the three corrections signals. Of course, since only one correction signal is present at a given time, the output signal of the summing amplifier 64 is merely the function of the single correction signal. In turn, the output signal of the summing amplifier 64 is coupled to one input terminal of the differential amplifier 78. As explained above, the other input signal to the differential amplifier 78 is dependent upon the white level signal and the calibrated level which has been set on the potentiometers 46, 48 and 50.

It is, of course, apparent that the above correction circuit has application in the color television art as well as to the color printing art. In an application where the balance of the color film must be matched to the sensitivity of a color television camera, this correction circuit could be easily inserted in such a system. Such a system would provide improved color compensation by permitting the chromatic and neutral correction levels to be adjusted to the specific characteristic of the color film and also to the color television apparatus.

Although the invention has been described in detail with particular reference to the preferred embodiment thereof, it will be understood that variations and modifications can be effected within the spirit and scope of the invention.

We claim:

1. Apparatus for facilitating the color correction of a plurality of input color signals representing the densities of the component colors of a color image, said apparatus comprising:

a. radiation-sensitive means for sequentially generating an input color signal corresponding to the densities of each of the component colors of the color image;

b. first circuit means responsive to the input color signals for providing continuously, during the sequential generation of each input color signal, a plurality of output color signals representative of each of the plurality of input color signals;

c. a corresponding plurality of matrix means responsive to the output color signals for providing a corresponding plurality of color correction signals dependent, in a predetermined relationship, upon the densities of the other component colors of the color image, each of said matrix means comprising a corresponding plurality of impedance means preset in a predetermined relationship and responsive to each of the output color signals to vary the output color signals in proportion to the preset relationship of the impedance means and to produce a color correction signal for each of the component colors of the color image; and d. second circuit means for applying each of the color correction signals to said radiation-sensing means to vary the sensitivity thereof to each of the component colors of the color image.

2. Apparatus as claimed in claim 1 further comprising:

a. synchronizing means for providing a plurality of timing signals indicative of the sequential generation of each of the input color signals by said radiation-sensitive means; and wherein said second circuit means further comprises b. first switching means responsive to each of said plurality of timing signals for sequentially applying said color correction signals to said radiation-sensitive means to vary the sensitivity thereof.

3. Apparatus as claimed in claim 1 wherein said first circuit means further comprises:

a. a plurality of capacitors each having a first and a second terminal;

b. second switching means responsive to each of said plurality of timing signals for applying one of the input color signals to the first terminal of one of said capacitors; and c. a plurality of differentia amplifier means each having first and second input terminals and an output terminal, said first input terminal of each of said differential amplifier means being connected to said second terminal of one of said capacitors, said second input terminal of said differential amplifier means being commonly connected to receive all of the input color signals, and said output terminals of said differential amplifier means being commonly connected to an individual impedance means of each of said matrix means.

4. Apparatus as claimed in claim 1 wherein said first circuit means further comprises:

a. a plurality of capacitors each having a first and a second terminal;

b. means for commonly applying the input color signals to the first terminals of said capacitors;

c. second switching means responsive to the sequential timing signals for sequentially charging the plurality of capacitors to a voltage level dependent upon the input color signals; and d. a plurality of differential amplifiers each having a first commonly connected input terminal, a second input terminal connected to the second terminals of said capacitors and an output terminal connected to one impedance of each of said matrix means, each differential amplifier comprising means responsive to the difference between the voltage levels on each of said capacitors and the voltage level of the input color signals for producing said output color signals continuously during the sequential generation of each input color signal.

* * * * *

PO-1050
(5/69)

UNITED STATES PATENT OFFICE
CERTIFICATE OF CORRECTION

Patent No. 3,644,664 Dated February 22, 1972

Inventor(s) Robert W. Huboi, Edward M. Waz & Thomas G. Seckel

It is certified that error appears in the above-identified patent and that said Letters Patent are hereby corrected as shown below:

Column 8, lines 8 and 12, delete "a." and "b.".

Column 8, line 16, change "Apparatus as claimed in claim 1" to --Apparatus as claimed in claim 2--.

Column 8, line 23, "differentia" should be --differential--.

Column 8, line 33, "Apparatus as claimed in claim 1" should read --Apparatus as claimed in claim 2--.

Signed and sealed this 4th day of July 1972.

SEAL)
ttest:

EDWARD M.FLETCHER,JR.
ttesting Officer

ROBERT GOTTSCHALK
Commissioner of Patents